Patented Mar. 24, 1942

2,277,485

UNITED STATES PATENT OFFICE 2,277,485

PROCESS FOR TREATING NUTS

Charles H. Frazier, Cincinnati, Ohio; Mildred B. Frazier administratrix of said Charles H. Frazier, deceased No Drawing. Application June 8, 1939
Serial No. 278,132

12 Claims. (Cl. 99—126)

The primary object of my invention is the provision of a treatment process for rendering easily frangible the shells of hard, woody-shelled nuts, without affecting the qualities of the nut meats, and without great expense. Incidental objects include giving to the nuts an improved appearance in many instances, and with certain types of nuts the provision of means for detecting spoiled or dried-out specimens.

My process is of general application to all types of nuts presenting the problems to which my invention is addressed; but I shall describe it in connection with Brazil nuts, which present these problems in an enhanced degree. The Brazil nut has a very hard and woody shell which not only is exceedingly difficult to crack, but which cannot usually be cracked in such a way as to leave the kernel whole. Though the Brazil nut has a large meat of excellent and popular flavor, these considerations have restricted the use of these nuts generally, and have kept them out of certain fields of utility.

Through the use of my process the shells of Brazil nuts become so frangible that the nuts may easily be cracked and shelled in the fingers; and the nut meats come out whole and of full flavor and wholesomeness. Thus not only are Brazil nuts made more available for table and casual use, but because my process furnishes a way of securing whole, shelled kernels, the Brazil nut is made available in confectionery and other arts where hitherto its use has been restricted.

The objects of my invention which have been set forth hereinabove or will be apparent to the worker in the art upon reading these specifications, I accomplish by that certain series of process steps of which I shall now specifically set forth a preferred exemplary embodiment.

In the following my procedure in the best form known to me, I take the Brazil nuts, and if they are very fresh or due to some other condition contain a high degree of moisture, I preferably first dry them. This may be done by placing the nuts in a drier and subjecting them to 75 to 80 degrees Centigrade with air circulation for a sufficient length of time to effect the desired drying. The drying should be such as to affect the shells only, and not such as to desiccate or unduly heat the kernels. The preliminary drying is optional in most instances, and is not necessary where the nuts have been stored a sufficient length of time to permit the shells to become air dry. Where the shells initially contain a large amount of moisture, the preliminary drying facilitates the subsequent step and cuts down the quantity of reagent which otherwise would have to be used.

The next step in the process is the treatment of the nuts with anhydrous aluminum chloride. Preferably the treatment device is a rotating drum into which the nuts and the reagent can be introduced, and which can with advantage be equipped with interior baffles to assure complete mixing and the continuous intimate association of the nuts and the powdered reagent. The amount of anhydrous aluminum chloride and the length of treatment can be varied depending upon desired results. I have found that one pound of anhydrous aluminum chloride to ten pounds of nuts is a satisfactory proportion for a treatment period of twenty-four hours, to give nuts the shells of which can easily be cracked in the hands. For the same results, a lesser proportion of the anhydrous aluminum chloride and a longer treatment period or vice versa, may be employed. In many instances such drastic softening of the shells may not be desired, in which cases the proportion of reagent or the treatment time or both may be reduced.

At the conclusion of the treatment period the treatment container may be emptied or dumped in such a way as to cause the nuts and powdered reagent to pass over a screen, to effect mechanical separation thereof. In some instances the reagent may be reused when fortified with new anhydrous aluminum chloride; in any event the used or exhausted reagent possesses some resale value.

To effect a further separation of the nuts and the powder, the nuts may be sprayed with water to remove any excess of the powder adhering to the shell.

The nuts should then be placed in a bath of water and allowed to soak in order to extract any aluminum salt and the major portion of any acid which may be present in the shells. During the soaking period the water is preferably changed frequently, for example, at least four times during a total soaking period of 45 minutes to an hour.

It is preferable next to wash and soak the nuts in a very dilute solution of sodium carbonate, the exact proportions of which are not critical. The use of the sodium carbonate solution cuts down the number of washes necessary to remove the acid; and the treatment is preferably continued until the wet shells are neutral as determined by litmus paper or other suitable indicator.

After the neutralization, the nuts are dried in a suitable drier until their moisture content is in the neighborhood of their original moisture content or less. The lower the moisture content the better the keeping qualities of the nuts. Again the drying should be at a relatively low temperature, say 75 or 80 degrees centigrade, with air circulation, and should not be so protracted as to affect the kernels.

The result of the process as described is an action on the shells whereby the shells become friable and may be crushed and broken very easily. There is a slight lightening of the color, an increased porosity, and in many instances the shells appear to develop a network of fine cracks. Larger cracks occasionally appear in the shells. The action is confined to the shells, however, and the kernels are not affected either as to appearance, wholesomeness or flavor. There is no significant amount of residual aluminum compounds. The shells when tested after treatment actually show less aluminum than before treatment; and the quantity of aluminum in the kernels is so small as to render testing difficult, and is well below the established permissible quantity of aluminum in food products.

The process specifically described hereinabove is preferred by me for a number of reasons, though variants are available as I shall hereinafter show. The specific process has wide latitude, and does not require close control to avoid attacking the kernels. It is rapid, does not require expensive or elaborate apparatus, and the cost of the treatment is far below the added value imparted to the nuts. It does not produce objectionable discoloration, nor is there any deposit in or on the shells after the washing. Nor do the treated nuts have an objectionable or chemical odor at the conclusion of the process.

While I do not wish to be bound by theory I believe that the action which occurs is due in greater or less degree to one or more of the following factors: the chemical action of chlorine and/or hydrochloric acid gas, the action of these gases under the influence of a catalyst, the action at least of chlorine when nascent, an intense local drying action on the shell due to the presence of a strongly hygroscopic substance, the disruptive effect of repeated drying and moistening.

Chlorination appears to have an important effect, since I have discovered that it is possible to soften the shells of nuts by the use of chlorine gas or hydrochloric acid gas either alone or in admixture. The procedure is not recommended by me, however, since it is difficult to control in such a way that the desired softening of the shells occurs before the kernels are attacked. A better result is secured, when using chlorine gas or hydrochloric acid gas, or mixtures of the two, by using also a substance which can act as a catalyst. Aluminum chloride is such a substance, and may be used in relatively small quantities. Thus I have obtained results with these gases and a quantity of anhydrous aluminum chloride one-fifth or less of the quantity mentioned above, in a treatment period of three hours. Control is again a problem; and careful manipulation is required to secure adequate softening without chlorinating the kernels.

The use of a chlorine-bearing compound, capable of releasing chlorine upon hydrolysis, and having strong hygroscopic properties together with a catalytic action is preferred by me because the use of such substances gives a process in which control is not critical and in which it is easy thoroughly to soften the shells of the nuts without running the danger of attacking the kernels. Aluminum chloride, which is the reagent I prefer is not, however, the only one which may be employed. Anhydrous ferric chloride by way of example, works very well although it is not quite as active as aluminum chloride. It may be employed in the same way, in the same proportions or minor variations thereof, and has approximately the same time cycles. The shells become softened, and the kernels are not attacked. Ferric chloride has the advantage of smaller cost. The shells of nuts treated with this reagent exhibit a slight tendency toward darkening, which however, for many uses is not objectionable.

Likewise antimony pentachloride which is a liquid, may be employed in my process. The shells are well softened and have a good appearance, and the kernels are not attacked. There is with antimony pentachloride a tendency to produce a white precipitate which is probably an oxide or oxychloride of antimony. This precipitate is not soluble in water, and while it may easily be washed from the exterior surfaces of the shells there is a tendency for it to collect in the main veins of the shell. This is not ordinarily objectionable though some may consider it so in nuts for table use. The white precipitate may be obscured in various ways, as by dyeing.

Sulphur monochloride and thionyl chloride both liquids, have the property of softening the shells. In the reaction which goes on there is formed a precipitate of sulphur, which is, of course, insoluble, but is easily washed from the surfaces of the shells. I do not prefer the sulphur compounds since they have a tendency to leave in the shells an odor of sulphur dioxide which unless neutralized persists for a considerable period. Neutralization is possible but increases the cost of the treatment process and entails additional washes.

Phosphorous pentachloride which is a solid, and phosphorous trichloride which is a liquid, may likewise be employed but entail careful operation and time control. This appears due to the fact that phosphoric acid or some other product of decomposition tends to attack the kernels of the nuts unless this control is exercised.

Thus for reasons which will now be clear, while other reagents may be used, and while some are particularly advantageous, where circumstances permit their use as an all around treating agent I prefer aluminum chloride. Aluminum chloride is not prohibitive in expense. I believe that its action is due in part to the fact that it hydrolyzes or decomposes when in contact with the moisture in the shells, giving off free nascent chlorine and hydrochloric acid gas which attack the shells chemically. In part, its action, I believe, also is due to the vigorous abstraction of water from the shells, as well as the catalytic action of the reagent itself in the presence of the liberated gases. The strong dehydrating action on the shells appears to be of importance, though I have not been able to secure proper softening of the shells through the use of dehydrating agents which are not at the same time chlorinating agents. Thus I have been unable to secure results with phosphoric anhydride (phosphorous pentoxide) though this is a strong dehydrating agent. Chlorinated lime, which is not strongly hygroscopic, has not proved very effective though it furnishes a ready source of chlorine gas.

I have described my process in connection with the treatment of Brazil nuts; but it is applicable to the treatment of any nuts having hard woody shells. In all instances the use of my process facilitates the cracking of the nuts even where this is done by machinery, and enables one to secure from the nuts larger and more perfect meat portions. In connection with Brazil nuts and certain other types of nuts my process furnishes an indication when the nuts are bad. Nuts in which the kernels are dried out or in which the kernels have become rotten, exhibit a different color when treated by my process and compared with the color of good nuts. This is important because in connection with Brazil nuts, for example, ordinary inspection methods are not to be relied upon for detecting the bad ones. Also my process is capable of rendering suitable for table or casual use nuts which have hitherto not been thus available. The finer grades of paper-shell pecans for example have come into wide favor; but other grades and other species of pecans while having equal flavor are too hard to crack, and in many instances cannot be cracked in such a way as to give whole kernels. The so-called Stuart pecans are exemplary of this type. Pecan nuts treated by my process have their shells so softened as to make them capable of being eaten like peanuts. The shells develop numerous small cracks and in many cases split, and can readily be further cracked and removed by hand. It will be apparent that my process of treating nuts operates to sterilize the shells thereof.

Modifications may be made in my invention without departing from the spirit thereof.

Having now fully described my invention, what I claim as new and desire to secure by Letters Patent, is:

1. A process of treating nuts to soften the shells thereof, which comprises treating said nuts to the action of chlorine in the presence of a catalyst chosen from a class consisting of aluminum chloride, ferric chloride, antimony pentachloride, sulphur monochloride, thionyl chloride, phosphorus pentachloride, and phosphorus trichloride, while controlling the reaction to prevent attack of the kernels of said nuts.

2. A process of treating nuts to soften the shells thereof, which comprises subjecting said nuts to the action of dry chlorine and hydrochloric acid gases in the presence of a catalyst, chosen from a class consisting of aluminum chloride, ferric chloride, antimony pentachloride, sulphur monochloride, thionyl chloride, phosphorus pentachloride, and phosphorus trichloride, and controlling the reaction to prevent attack of the kernels of said nuts.

3. A process of treating nuts to soften the shells thereof, which comprises intimately associating the nuts with an anhydrous substance chosen from a class consisting of aluminum chloride, ferric chloride, antimony pentachloride, sulphur monochloride, thionyl chloride, phosphorous pentachloride, and phosphorous trichloride for a length of time sufficient to render the shells thereof more readily frangible.

4. A process of treating nuts to soften the shells thereof, which comprises intimately associating the nuts with an anhydrous substance chosen from a class consisting of aluminum chloride, ferric chloride, antimony pentachloride, sulphur monochloride, thionyl chloride, phosphorous pentachloride, and phosphorous trichloride for a length of time sufficient to render the shells thereof more readily frangible, and afterward washing and drying the nuts.

5. A process of treating nuts to soften the shells thereof, which comprises intimately associating the nuts with an anhydrous substance chosen from a class consisting of aluminum chloride, ferric chloride, antimony pentachloride, sulphur monochloride, thionyl chloride, phosphorous pentachloride, and phosphorous trichloride for a length of time sufficient to render the shells thereof more readily frangible, and afterward washing, neutralizing and drying the nuts.

6. A process of treating Brazil nuts to soften the shells thereof, which comprises intimately mixing Brazil nuts and anhydrous aluminum chloride for a treatment period sufficient to soften the shells without attacking the kernels.

7. A process of treating Brazil nuts to soften the shells thereof, which comprises intimately associating the nuts with anhydrous aluminum chloride for a treatment period of approximately 12 to 60 hours, then separating the nuts from the aluminum chloride, washing and drying them.

8. A process as claimed in claim 7 in which the nuts are given a preliminary drying before association with the aluminum chloride.

9. A process as claimed in claim 7 in which after washing and prior to drying the nuts are treated with a dilute alkaline solution.

10. A process as set forth in claim 7 in which the nuts prior to the association with the aluminum chloride are dried and in which, after washing, the nuts are neutralized in a dilute alkaline solution prior to drying.

11. A process as claimed in claim 7 in which the quantity of aluminum chloride is of the order of one pound thereof to ten pounds of nuts.

12. A process of treating Brazil nuts to soften the shells thereof, which comprises intimately associating the nuts for a treatment period with a material chosen from the class consisting of aluminum chloride, ferric chloride, antimony pentachloride, sulphur monochloride, thionyl chloride, phosphorous pentachloride, and phosphorous trichloride.

CHARLES H. FRAZIER.